Aug. 29, 1967  P. J. IMSE  3,338,381
GREASE CONNECTION FOR CONVEYOR ROLLS
Filed May 23, 1966  2 Sheets-Sheet 1

INVENTOR
PHILIP J. IMSE
BY *Sughrue, Rothwell, Mion, Zinn & Macpeak*
ATTORNEYS

Aug. 29, 1967  P. J. IMSE  3,338,381
GREASE CONNECTION FOR CONVEYOR ROLLS
Filed May 23, 1966  2 Sheets-Sheet 2

INVENTOR
PHILIP J. IMSE
BY
ATTORNEYS

United States Patent Office 3,338,381
Patented Aug. 29, 1967

3,338,381
GREASE CONNECTION FOR CONVEYOR ROLLS
Philip J. Imse, Wauwatosa, Wis., assignor to Rex Chainbelt Inc., Milwaukee, Wis., a corporation of Wisconsin
Filed May 23, 1966, Ser. No. 552,052
9 Claims. (Cl. 198—192)

ABSTRACT OF THE DISCLOSURE

An assembly providing a grease connection passage for adjacent spaced rolls of a conveyor idler includes a separable housing carrying a pair of short resilient tubes which extend into hollow stationary shafts of the adjacent rolls. Each tube has a flanged end within the housing and a thin walled end within one shaft. The separable housing is supported on a column and a captive screw normally holds the separable housing together.

---

This invention relates to improvements in a greasing arrangement for a conveyor idler and especially to a through greasing assembly for adjacent conveyor rolls of a conveyor idler.

A conveyor idler is composed of several conveyor rolls which are rotatably supported on stationary shafts and may be positioned, for example, in a trough arrangement for supporting a conveyor belt for the transport of bulk material. The bearings supporting the individual rolls of the idler must be lubricated, for example by grease connections. One known way of greasing conveyor idlers is by individual grease connections to each roll of the idler. The disadvantages of such arrangement include the costly and cumbersome construction and time consumed in maintaining and greasing at three individual grease fittings. Through connections for single point greasing of adjacent conveyor rolls have also been known but such through connections usually tie the individual rolls of the idler together as a unit and effectively prevent one conveyor roll from being removed by itself without removing the entire idler.

This invention provides a unique through greasing assembly for adjacent conveyor rolls of a conveyor idler while allowing individual rolls to be removed as required. The construction includes a pair of resilient tubular members connected to hollow shafts supporting each idler and a split housing carried by a roll support column connecting the outer ends of the tubular members.

The other features, advantages and construction of this invention will be apparent from the following detailed description taken in connection with the accompanying drawings illustrating the best mode of carrying out the invention.

Figure 1:
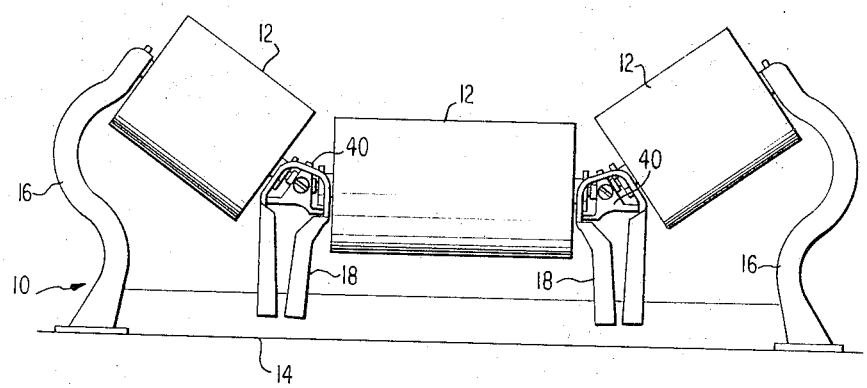
FIGURE 1 is an elevation view of a conveyor idler which includes three conveyor rolls.

Referring to the drawings, a conveyor idler 10 includes three rolls 12 which are suitably supported from a stand 14 by end columns 16 and intermediate support columns 18.

Figure 2:
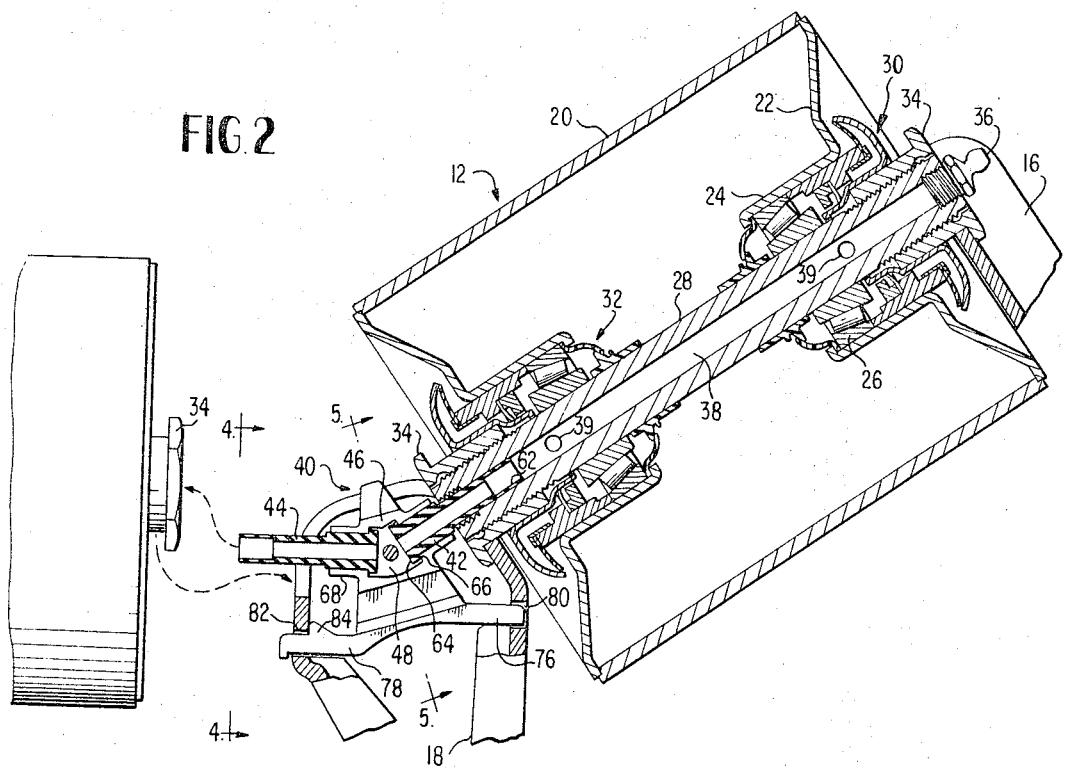
FIG. 2 is an enlarged transverse sectional elevation through one idler and through the grease connection assembly of this invention.
Figure 3:
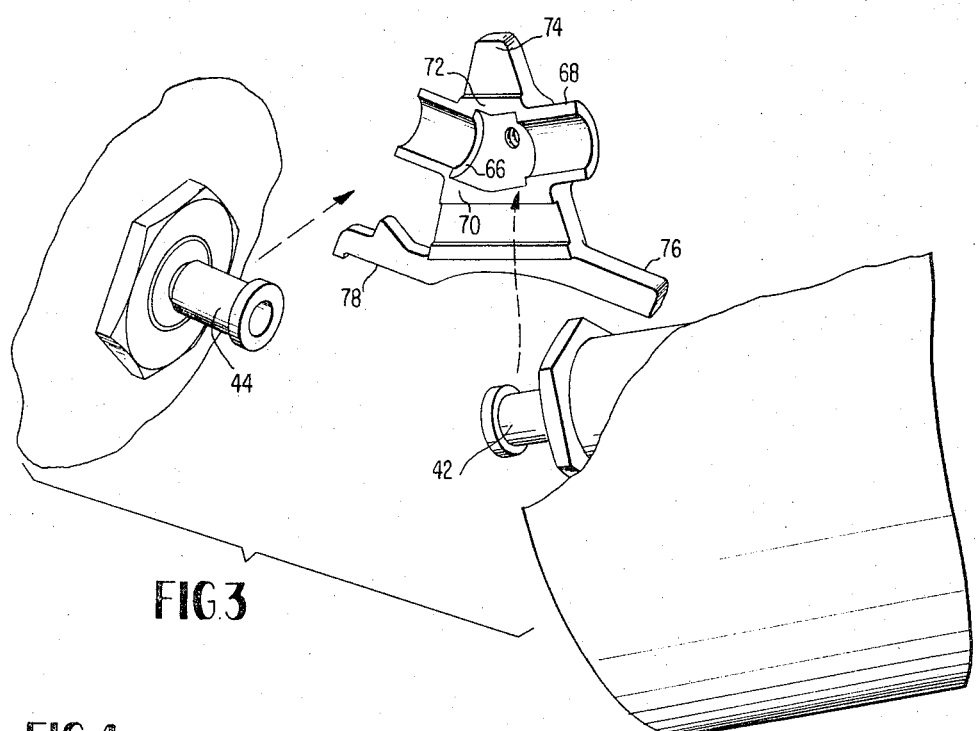
FIG. 3 is a perspective view showing a portion of the through grease connection housing component of this invention and the tubular members of the through grease connection.

Each roll 12, as shown in FIG. 2, includes an outer shell 20 secured to dished ends 22 having internal flanges 24 which are rotatably supported on anti-friction bearings 26 for rotation about a hollow support shaft 28. A suitable seal assembly 30 including a grease seal and dust seal is at the outer end of the bearing and a seal 32 is at the inner end of the bearing. Nuts 34 are screwed onto the ends of the support shaft 28 and cooperate with the end support column 16 and intermediate support column 18 to rigidly hold the shaft 28. Grease is applied through a grease fitting 36 to the hollow inside portion 38 of shaft 28 and it passes through transverse openings 39 to the bearings. Grease applied through fitting 36 and passage 38 passes through a grease connection assembly 40, which constitutes this invention, into the next adjacent roll 12, and a similar grease connection 40 may be between all adjacent rolls 12 of the idler 10, see FIGURE 1. In this manner grease applied to fitting 36 may lubricate all the bearings in all three rolls.

As shown in FIGS. 2–5, the through grease connection assembly 40 includes a pair of resilient tubular members 42 and 44 and a housing 46 having a cavity 48 providing fluid communication between the interior of the tubular members 42 and 44. Tubular members 42 and 44 have one end within shaft 28 of roll 12 and the other end in the housing.

Figure 4:
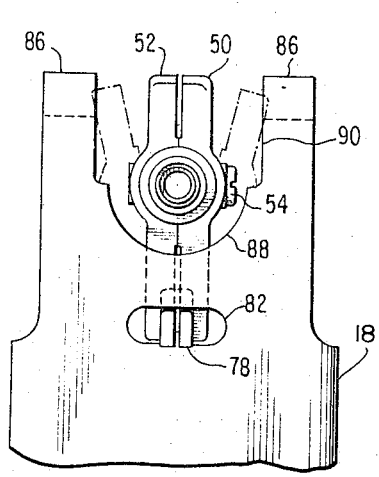
FIG. 4 is an enlarged view taken along line 4—4 of FIG. 2.
Figure 5:
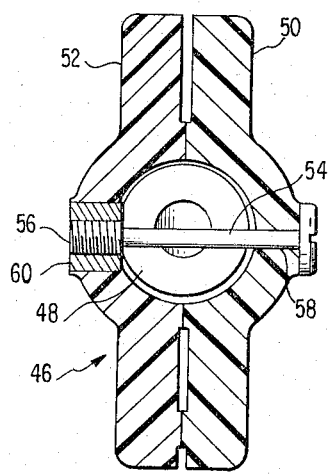
FIG. 5 is an enlarged sectional view taken along line 5—5 of FIG. 2.

It is thus seen in FIGS. 4 and 5 the housing 46 includes components 50 and 52 which are secured together in assembled relationship by screw 54. This screw is captive in housing component 50 by means of its threaded portion 56 being larger than hole 58 for the screw shank. The screw is threaded into an internally threaded ferrule 60 embedded in the housing component 52.

As shown in FIGS. 2 and 4, each of the tubular members has a thin end portion 62 which is positioned inside passage 38 on the internal walls of the hollow tubular support shaft 28. The other end of each tubular member includes a flange 64 which is seated against a seat 66, see FIG. 3, in the interior of the housing 46. The housing also includes cylindrical extensions 68 surrounding a portion of the tubular members 42 and 44. Additionally, the mating surfaces of the housing components 50 and 52 include seal surfaces 70 and 72, FIG. 3.

Each of the housing components includes a tab portion 74 at the top portion thereof and legs 76 and 78 extending outwardly from the bottom portions of the housing components. Openings 80 and 82, FIG. 2, are provided in the intermediate support column 18 for receiving the legs 76 and 78 of the housing components 50 and 52. A stop 84 may be provided for keeping the legs in the openings.

The intermediate support column 18 includes at its top spaced stop loops 86, see FIG. 4, and includes at its sides a curved support surface 88 and nut lock edges 90 on the stop loops 86. In this manner, a nut 34 may be positioned as shown in FIG. 2 with the curved portion of the nut shank resting in support surface 88 and the flat surfaces 90 preventing the nut from rotating.

In operation, grease is applied through grease fitting 36 and fills the passage 38 of hollow tubular shaft 28 lubricating bearings 26 of roll 12; the grease pressure acting equally on all surfaces, forces the thin end portion 62 of tubular member 42 against the interior surface of passage 38. With the housing 46 closed securely by screw 54 the grease passes from tubular member 42 into cavity 48 and then into tubular member 44 and into the next adjacent roll 12 as shown in FIG. 2 to the left. The pressure in cavity 48 forces the flanged end 64 of the tubular members 42 and 44 against the seats 66. The grease passes through all the rolls 12 lubricating the bearings therein via through grease connections 40.

In normal operation the resilient tubular members 42 and 44 are carried by the rolls and the flanged ends 64 thereof can be inserted within the cavity against their seats 66 by opening these housing components 50 and 52 by unscrewing screw 54. When this happens the housing components 50 and 52 assume the dotted line position shown in FIG. 4 wherein they pivot about legs 76 and 78 located in openings 80 and 82 and the outward pivotal movements of the componnets 50 and 52 are stopped by the stop loops 86. With the components 50 and 52 in the position of the dotted line in FIG. 4, the rolls 12 may be moved by forcing the roll upwardly with a force applied at a right angle to the axis of shaft 28 so that the nuts 34 may pass upwardly and outwardly of the loop edges 90. In this manner any individual roll 12 may be easily removed from the assembly and replaced or repaired and reassembled back in the support columns. With the rolls back in the support columns the housing components 50 and 52 can then be assembled together with the tubular members 40 and 42 having their flanges 64 against the seats 66 and the screw 54 may be tightened. The screw 54 is a captive screw as conveyor idlers are commonly used at a height above the ground and being captive the screw cannot escape, neither can the housing components escape from their position as carried by the intermediate support 18.

While the invention has been particularly shown and described with reference to a preferred embodiment thereof, it will be understood by those skilled in the art that various changes in form and details may be made therein without departing from the spirit and scope of the invention.

What is claimed is:

1. A grease connection assembly for adjacent rolls of a conveyor idler, the idler including spaced rolls having outer shells rotatably journalled on stationary hollow shafts by suitable bearings, the shafts including grease passages to lubricate the roll bearings, the grease connection assembly between adjacent rolls comprising: a pair of resilient tubular members each member having one end extending into the hollow shafts of adjacent rolls, and a housing enclosing the other end of each tubular member, the housing being longitudinally split and separable into components to enable the tubular members to be removed therefrom and therefor allow removal of a roll and associated tubular member, the housing having a cavity connecting the ends of the tubular members and providing fluid communication between the tubular member and hence a grease passage between adjacent rolls.

2. A grease connection assembly as in claim 1 wherein each tubular member includes a flange on the end enclosed within the housing for cooperating with a flange seat in the cavity of the housing.

3. A grease connection assembly as in claim 1 wherein the housing includes tubular cylindrical textensions to support the resilient tubular members.

4. A grease connection assembly as in claim 1 wherein the ends of the resilient tubular members extending into the hollow shafts of the rolls have a thinner tubular wall than the remaining portion of the resilient tubular member to enable pressure of lubricant to seal the ends of the resilient tubular member against the inside diameter of the hollow shaft.

5. A grease connection assembly as in claim 1 wherein the separable housing components are carried by a stationary roll support column and are held by the column even when separated.

6. A grease connection assembly as in claim 5 wherein the separable housing components are secured together by screws to secure the ends of the resilient tubular members therein.

7. A grease connection assembly as in claim 6 wherein the screw is permanently captured by one of the housing components and screwed into the other housing component.

8. A grease connection assembly as in claim 5 wherein the support column includes means for pivotally holding the lower side of the housing components and also includes stop portions for stopping the top sides of the housing components after a predetermined amount of separation.

9. A grease connection assembly as in claim 8 wherein there are three adjacent rolls positioned to support a conveyor belt in troughed position and two grease connection assemblies, one between each pair of adjacent pair of conveyor rolls.

References Cited
UNITED STATES PATENTS 2,539,792   1/1951   Niemitz _____ 198—192 X EVON C. BLUNK, *Primary Examiner.*

H. C. HORNSBY, *Assistant Examiner.*